(12) United States Patent
Hong

(10) Patent No.: US 9,187,859 B2
(45) Date of Patent: Nov. 17, 2015

(54) MOUNTING UNIT FOR WALL-MOUNTED WASHING MACHINE

(71) Applicant: Dongbu Daewoo Electronics Corporation, Seoul (KR)

(72) Inventor: Seong Bo Hong, Seoul (KR)

(73) Assignee: DONGBU DAEWOO ELECTRONICS CORPORATION, Seoul (KR)

( * ) Notice: Subject to any disclaimer, the term of this patent is extended or adjusted under 35 U.S.C. 154(b) by 1 day.

(21) Appl. No.: 14/145,795

(22) Filed: Dec. 31, 2013

(65) Prior Publication Data

US 2015/0176189 A1   Jun. 25, 2015

(30) Foreign Application Priority Data

Dec. 23, 2013  (KR) ........................ 10-2013-0161128

(51) Int. Cl.
| | |
|---|---|
| *D06F 37/20* | (2006.01) |
| *D06F 39/12* | (2006.01) |
| *F16M 13/02* | (2006.01) |
| *F16F 7/00* | (2006.01) |
| *F16F 9/00* | (2006.01) |

(52) U.S. Cl.
   CPC .............. *D06F 39/125* (2013.01); *D06F 37/20* (2013.01); *F16F 7/00* (2013.01); *F16F 9/006* (2013.01); *F16M 13/02* (2013.01)

(58) Field of Classification Search
   CPC ........ D06F 39/125; D06F 37/20; F16F 9/006; F16F 7/00; F16M 13/02
   See application file for complete search history.

(56) References Cited

U.S. PATENT DOCUMENTS

| | | | | |
|---|---|---|---|---|
| 3,383,811 | A * | 5/1968 | Ades | 52/28 |
| 4,213,426 | A * | 7/1980 | Longhouse | 123/41.49 |
| 4,568,243 | A * | 2/1986 | Schubert et al. | 415/213.1 |
| 4,807,716 | A * | 2/1989 | Hawkins | 180/65.1 |
| 5,126,607 | A * | 6/1992 | Merriman, Jr. | 310/51 |
| 5,758,861 | A * | 6/1998 | Feldhaus | 248/638 |
| 6,351,380 | B1 * | 2/2002 | Curlee et al. | 361/695 |
| 7,186,075 | B2 * | 3/2007 | Winkler et al. | 415/119 |
| 7,317,267 | B2 * | 1/2008 | Schmid et al. | 310/51 |
| 7,347,665 | B2 * | 3/2008 | Thoma | 415/213.1 |
| 2010/0050700 | A1 * | 3/2010 | Bongini | 68/139 |
| 2011/0050064 | A1 | 3/2011 | Phillips et al. | |

FOREIGN PATENT DOCUMENTS

| | | |
|---|---|---|
| KR | 20020035985 | 5/2002 |
| KR | 20060125298 | 12/2006 |
| KR | 1020130112638 | 10/2013 |

* cited by examiner

*Primary Examiner* — Jeanette E Chapman

(57) ABSTRACT

A mounting unit for a wall-mounted washing machine is disclosed. When the washing machine is on a wall surface, a mounting part of the mounting unit is beyond a frame edge of the mounting unit, thereby a cushion pad of the mounting unit to reduce vibrations and noise from the washing machine. The mounting unit includes a curtain at a frame edge of a body frame such that a gap between the washing machine and the wall surface may be covered by the curtain, thereby stably installing the washing machine, even though the wall surface is not completely flat.

17 Claims, 8 Drawing Sheets

MOUNTING UNIT FOR WALL-MOUNTED WASHING MACHINE

CROSS-REFERENCE TO RELATED APPLICATIONS

This application is based on and claims priority from Korean Patent Application No. 10-2013-0161128, filed on Dec. 23, 2013, the disclosure of which is incorporated herein in its entirety by reference.

TECHNICAL FIELD

The present disclosure relates to a mounting unit for a wall-mounted washing machine, and more particularly, to a mounting unit for a wall-mounted washing machine that may reduce vibrations and noise when the washing machine is installed on a wall surface, and allow a gap between the washing machine and the wall surface to be covered.

BACKGROUND

In general, a wall-mounted washing machine has a small external size, and may be installed on the wall surface, thereby improving spatial utilization of a small and/or narrow space.

A general configuration of the wall-mounted washing machine includes a cabinet, a motor, a drum, a door, and a drain. Hereinafter, the wall-mounted washing machine is simply referred to as a washing machine.

A mounting unit for a conventional wall-mounted washing machine will be described with reference to FIGS. 1 to 3. FIGS. 1 and 2 are a front perspective view and a rear perspective view for explaining a wall-mounted washing machine in the related art. FIG. 3 is an illustrative view for explaining an example in which the wall-mounted washing machine in the related art is installed on a wall surface.

As illustrated in FIGS. 1 and 2, a body frame 20 is provided at a back surface or side of a washing machine 10, a cabinet 30 is at a front side of the body frame 20, and a door 40 is on or at a front side of the cabinet 30. A control unit 50 is on or at one side of the cabinet 30. Constituent elements for performing a washing process are disposed in the cabinet 30. Because the constituent elements are known, a more detailed description thereof will be omitted.

A frame edge 21 defines or is at a back surface edge of the body frame 20, and a mounting part 22 is on or in the body frame 20. A cushion and/or pad 60 is on the mounting part 22.

Meanwhile, the motor 70 and the tub 80 may be connected by a belt and one or more power transmission elements. That is, when power is generated from the motor 70, the power is transmitted to the tub 80 by the belt and power transmission element(s).

Meanwhile, a surface height of the frame edge 21 may be the same as a height of the mounting part 22.

As illustrated in FIG. 3, the conventional washing machine 10 may be installed on a wall surface W. In more detail, anchor bolts 90 are installed in the wall, the body frame 20 is attached to the anchor bolts 90, and the body frame 20 is fixed to the wall surface W by fastening nuts to threaded end portions of the anchor bolts 90.

In this case, the cushion and/or pad 60 is on the mounting part 22, and the cushion and/or pad 60 is compressed by tightening the nut to the anchor bolt 90, as described above. As a result, the frame edge 21 of the body frame 20 comes into direct contact with the wall surface W.

When the washing machine 10 is installed on the wall surface W, as described above, and thereafter the washing machine 10 is operated, the washing machine 10 may vibrate while the motor 70 operates. Theoretically, the vibration may be absorbed by the cushion and/or pad 60, but in practice, whenever the frame edge 21 comes into direct contact with the wall surface, vibrations and noise may be transmitted to and/or along the wall surface W. This vibration may cause inconvenience and/or displeasure to the user, and may cause damage to the wall and/or wall surface.

Meanwhile, the wall surface W may not be completely or uniformly flat. Therefore, when the washing machine 10 is installed on the wall, a gap a may be formed, as illustrated in FIG. 3. Because of the gap a, noise and vibrations generated when operating the motor 70 and the tub 80 may be more easily transmitted to the outside (e.g., the wall).

External and/or foreign substances, moisture, or the like may enter the back surface and/or side of the washing machine 10 through the gap a. Meanwhile, as illustrated in FIG. 2, constituent elements such as a drive wheel or pulley of the motor 70, a driven wheel or pulley of the tub 80, a belt, and the like are exposed at the back surface and/or side of the washing machine 10. These constituent elements may be exposed directly to the foreign substances or the moisture, which may cause wear and/or damage to, and eventually failure of, the washing machine 10.

A conventional wall-mounted washing machine may be disclosed in Korean Patent Application Laid-Open No. 10-2013-0064624 (Jun. 18, 2013).

SUMMARY

The present disclosure has been made in an effort to provide a mounting unit for a wall-mounted washing machine, which prevents vibrations and noise generated from the washing machine from being transmitted directly to a wall surface when the washing machine is installed on the wall surface.

The present disclosure has been made in an effort to provide a mounting unit for a wall-mounted washing machine, which seals a gap and/or prevents the gap from forming between a wall surface and the washing machine when the washing machine is installed on the wall surface, even though the wall surface on which the washing machine is installed is not completely or uniformly flat.

Technical objects to be achieved in or by the present disclosure are not limited to the aforementioned technical objects, and other unmentioned technical objects will be understood from the description below by those skilled in the technical field to which the present disclosure pertains.

An exemplary embodiment of the present disclosure provides a mounting unit for a wall-mounted washing machine, including a body frame having a first frame edge and a mounting part that extends beyond the first frame edge; and a cushion and/or pad at or on the mounting part and configured to reduce vibrations and noise (e.g., of the washing machine), and when the body frame is fixed to a wall surface, the first frame edge is away from the wall surface.

The mounting unit for a wall-mounted washing machine according to exemplary embodiments of the present disclosure may further include a curtain at or on the first frame edge such that when the body frame is fixed to the wall surface, a gap between the body frame and the wall surface includes the curtain.

According to the mounting unit for a wall-mounted washing machine according to exemplary embodiments of the present disclosure, a pocket and/or groove may be at the first frame edge, and the curtain may be in the pocket and/or groove.

According to the mounting unit for a wall-mounted washing machine according to exemplary embodiments of the present disclosure, a second frame edge may be outside the first frame edge, at least partially defining the pocket and/or groove, and the first frame edge may extend beyond the second frame edge.

According to the mounting unit for a wall-mounted washing machine according to exemplary embodiments of the present disclosure, the pocket and/or groove may have a shape similar to the shape of the first frame edge from a direct back view of the body frame.

According to the mounting unit for a wall-mounted washing machine according to exemplary embodiments of the present disclosure, the pocket and/or groove may have a width and a depth that is greater than the width.

According to the mounting unit for a wall-mounted washing machine according to exemplary embodiments of the present disclosure, when no external force is applied to the curtain, a width of the curtain may be 105% to 140% greater than the width of the pocket and/or groove.

According to the mounting unit for a wall-mounted washing machine according to exemplary embodiments of the present disclosure, a flap may be at or in an insert of the curtain, and the flap may extend outward.

Another exemplary embodiment of the present disclosure provides a mounting unit for a wall-mounted washing machine, including a body frame having a first frame edge and a pocket and/or groove at the first frame edge; and a curtain in the first frame edge, wherein when the body frame is fixed to a wall surface, a gap between the body frame and the wall surface includes the curtain.

According to the mounting unit for a wall-mounted washing machine according to exemplary embodiments of the present disclosure, the body frame may have a mounting part that extends beyond the first frame edge, a cushion and/or pad may be at or on the mounting part and configured to reduce vibrations and noise, and when the body frame is fixed to a wall surface, the first frame edge may be away from the wall surface.

Specific items of other embodiments are included in the detailed description and the drawings.

The mounting unit for the wall-mounted washing machine according to exemplary embodiments of the present disclosure, configured as described above, provides a mounting part that extends beyond the frame edge of the body frame, thereby allowing vibrations and noise to be absorbed by the cushion and/or pad that is at or on the mounting part. That is, when the washing machine is installed on the wall surface, vibrations and noise generated from the washing machine may not be transmitted directly to the wall surface (e.g., through the body frame).

The mounting unit for the wall-mounted washing machine according to exemplary embodiments of the present disclosure may have a curtain on and/or in the back surface of the body frame. The curtain (or gasket or seal; herein, the "curtain") is configured to cover or close a gap between the wall surface and the washing machine. Therefore, foreign substances or moisture may be prevented from entering or flowing into the back surface or side of the washing machine.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
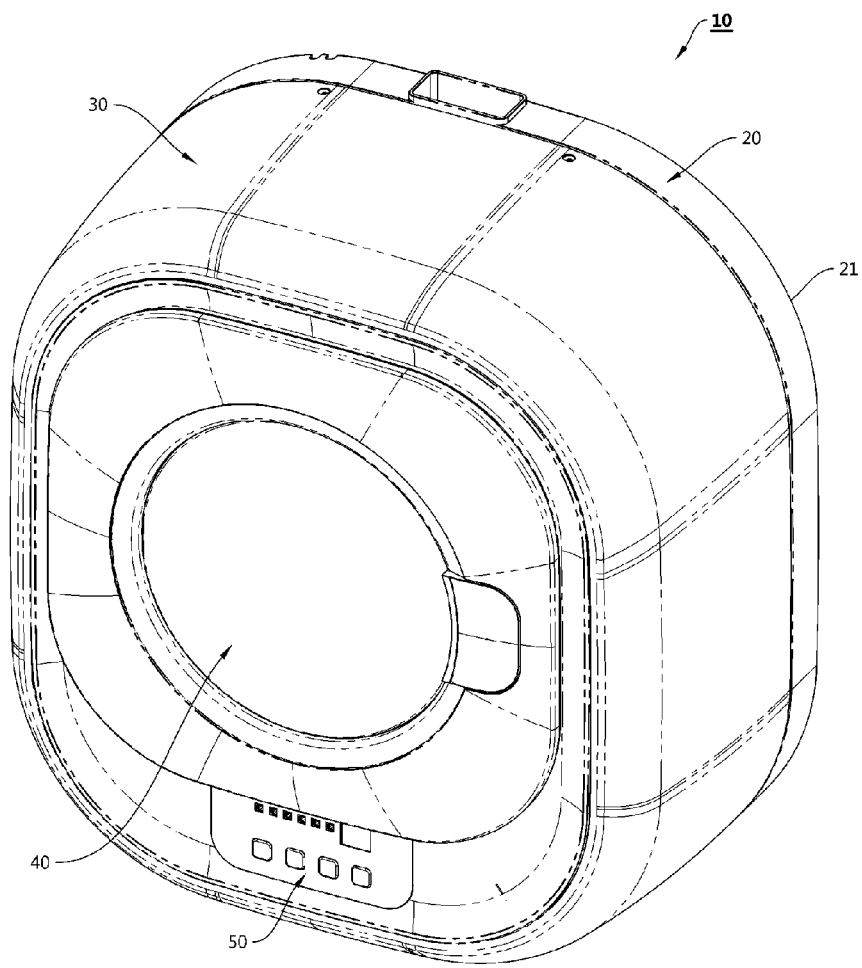
FIGS. 1 and 2 are a front perspective view and a rear perspective view of a wall-mounted washing machine in the related art.
Figure 2:
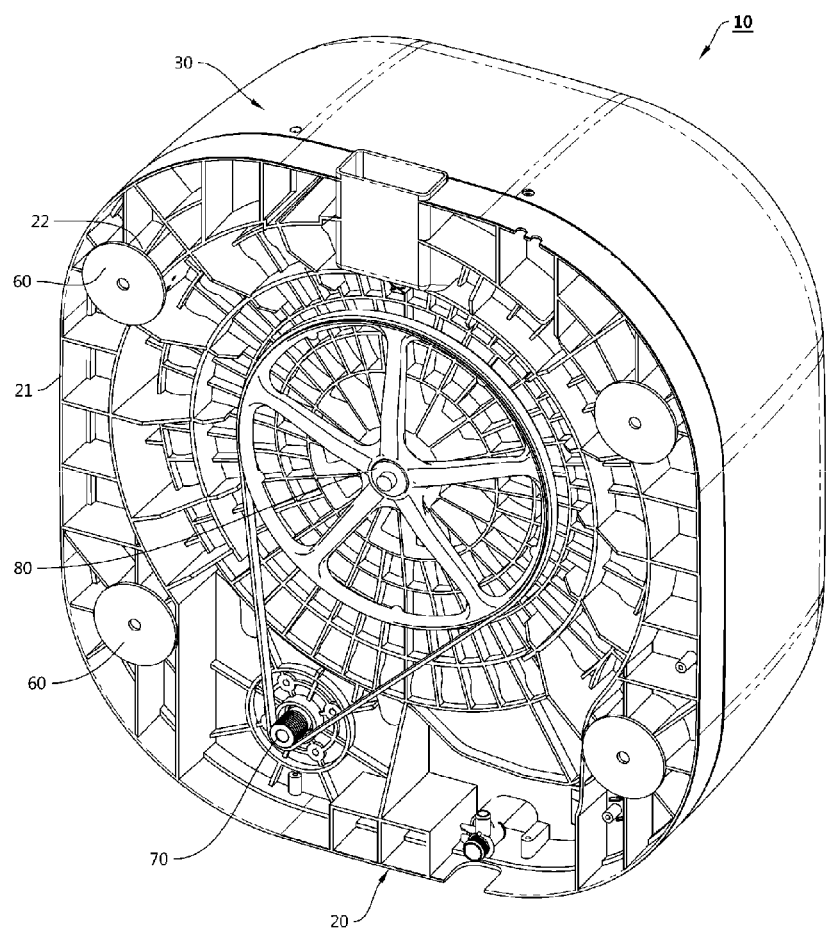
Figure 3:
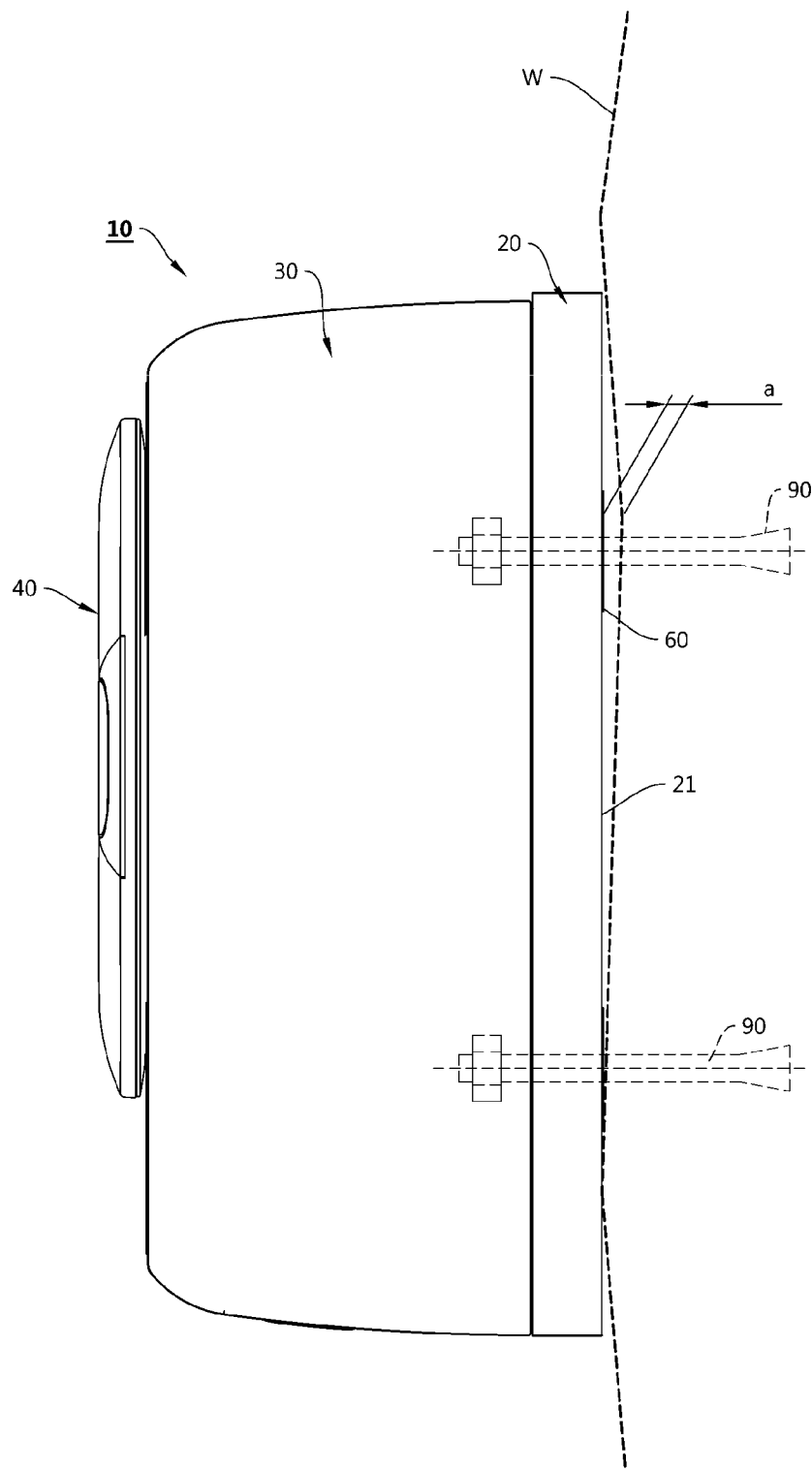
FIG. 3 is an illustrative view for explaining an example in which a conventional wall-mounted washing machine is installed on a wall surface.

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

Advantages and features of the present disclosure and methods of achieving the advantages and features will be clear with reference to exemplary embodiments described in detail below, together with the accompanying drawings.

Hereinafter, one or more exemplary embodiments of the present disclosure will be described in detail with reference to the accompanying drawings. It should be appreciated that the exemplary embodiments described below are illustratively described for helping the understanding of the present disclosure, and the present disclosure may be modified to carry out various embodiments different from the exemplary embodiments described herein. In the description of the present disclosure, detailed descriptions and specific drawings for known related functions and constituent elements may be omitted when the detailed descriptions and the specific drawings may unnecessarily obscure the subject matter of the present disclosure. For helping the understanding of the present disclosure, the accompanying drawings are not necessarily illustrated based on actual scales, and parts of the constituent elements may be exaggerated in terms of size.

The terms used in the description may be defined in consideration of the functions and/or operations of the present disclosure, and their meanings may vary depending on the intention or usual practice of a manufacturer. Therefore, the definitions should be made based on the entire contents of the present specification.

Like reference numerals indicate like elements throughout the specification and drawings.

Hereinafter, a mounting unit for a wall-mounted washing machine according to one or more exemplary embodiments of the present disclosure will be described with reference to FIGS. 4 to 7.

Figure 4:
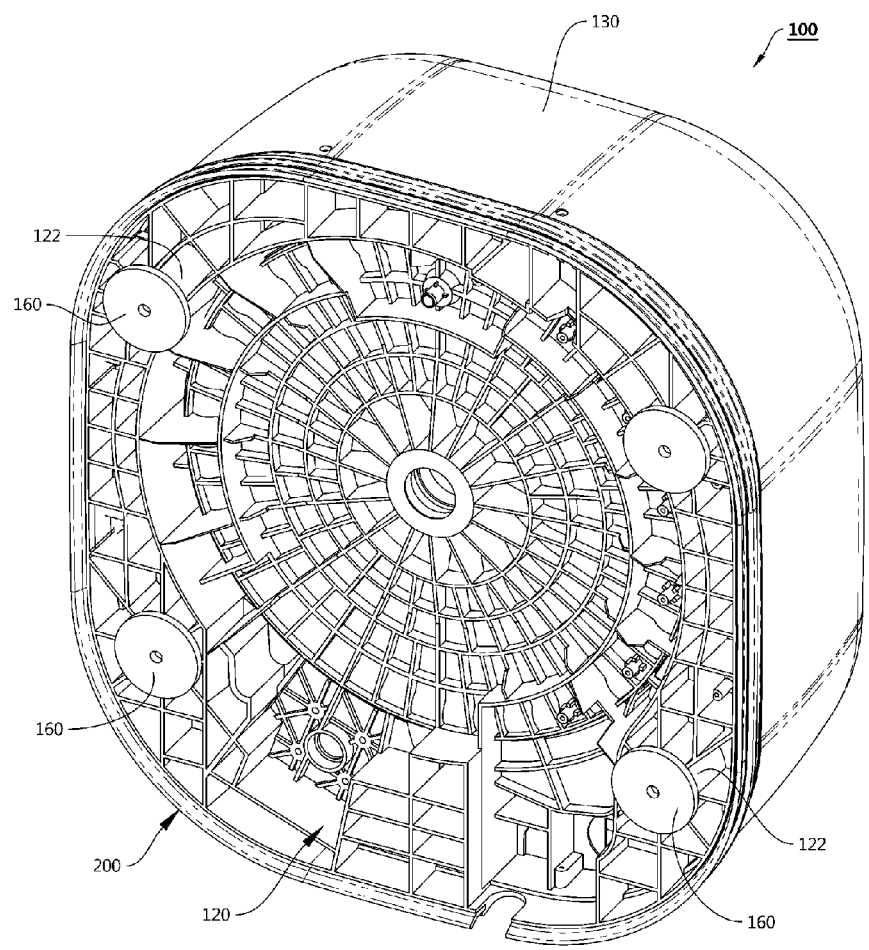
FIG. 4 is a rear perspective view for explaining a mounting unit for a wall-mounted washing machine according to exemplary embodiments of the present disclosure.
Figure 5:
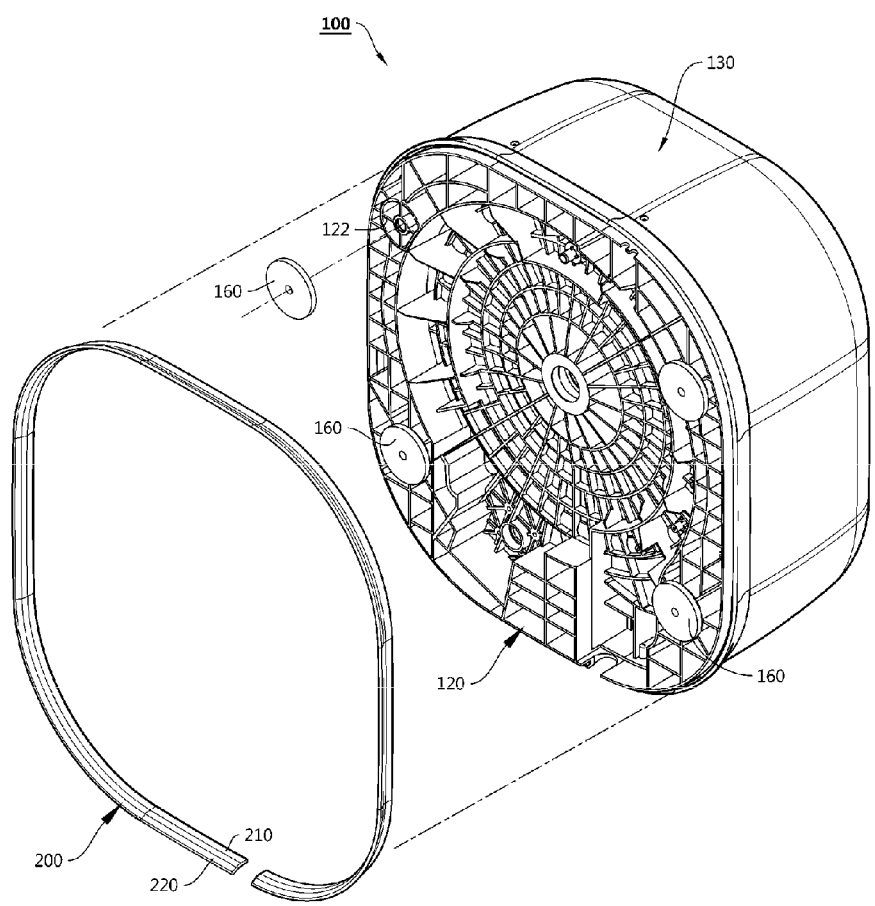
FIGS. 5 to 7 are views for explaining a structure for coupling a cushion and/or pad and a curtain of the mounting unit according to exemplary embodiments of the present disclosure.
Figure 6:
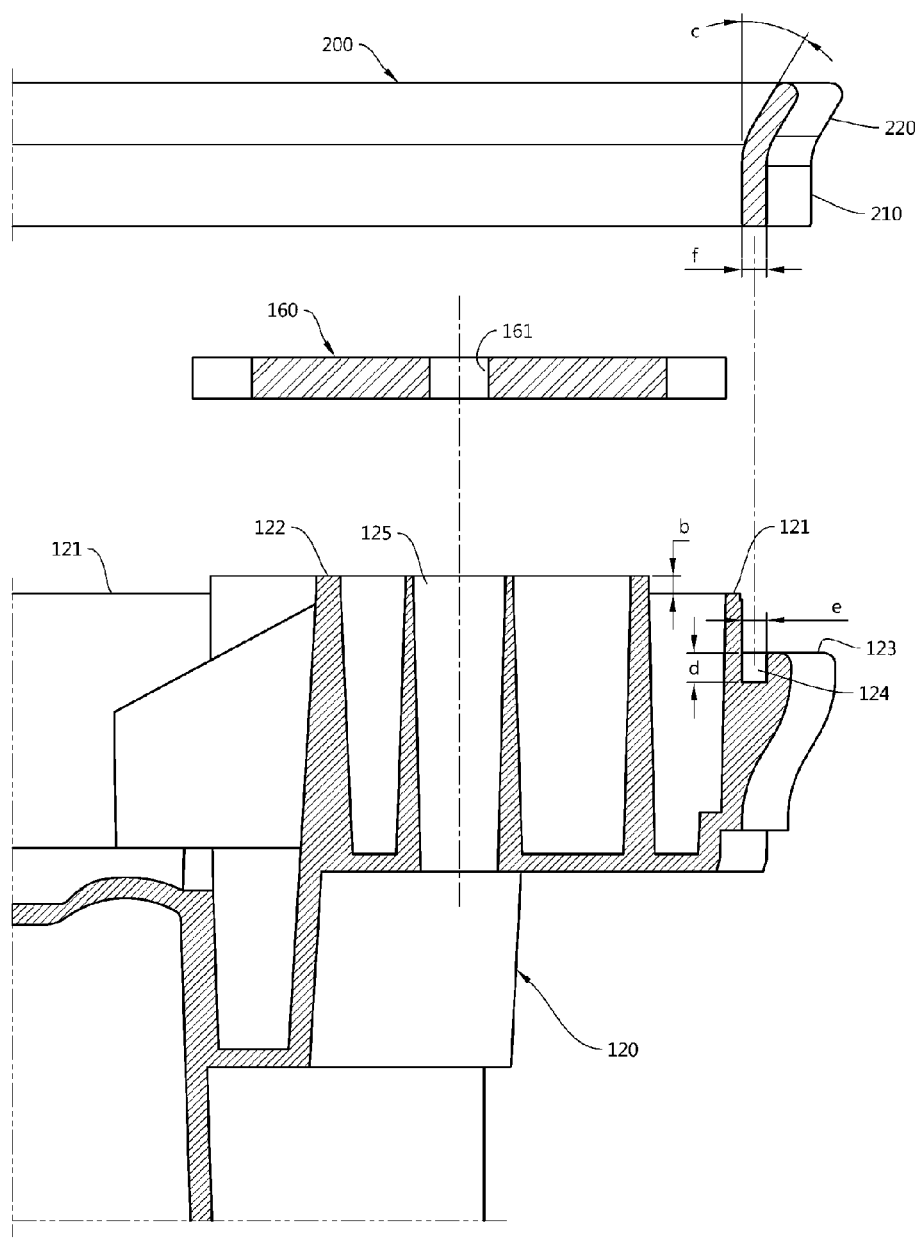
Figure 7:
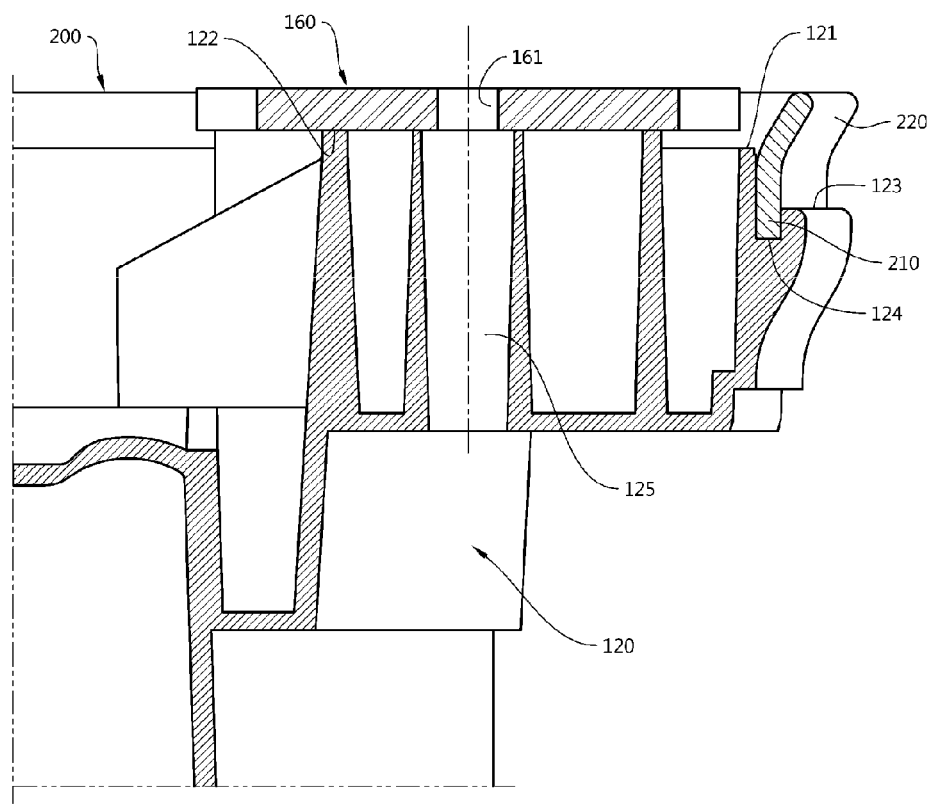

The accompanying FIG. 4 is a rear perspective view for explaining the mounting unit for a wall-mounted washing machine according to exemplary embodiments of the present disclosure. FIGS. 5 to 7 are views for explaining a structure for coupling a cushion and/or pad and a curtain of the mounting unit according to exemplary embodiments of the present disclosure.

As illustrated in FIGS. 4 to 7, cushions and/or pads 160 are on a body frame 120, and a curtain 200 is at and/or along a first frame edge 121.

One or more mounting parts are formed on a back surface of the body frame 120, and the mounting parts 122 protrude or extend beyond the first frame edge 121 (see distance b in FIG. 6). A mounting hole 125 is in the mounting part 122. An anchor bolt 190 penetrates and/or is placed through the mounting hole 125 when the washing machine 100 is installed on a wall surface w.

The cushion and/or pad 160 is provided on the end of the mounting part 122 extending beyond the frame edge 121. A hole 161 is in a center of the cushion and/or pad 160. The anchor bolt 190 penetrates and/or is placed through the hole 161 when the washing machine 100 is installed on the wall surface w.

When the washing machine 100 is installed on the wall surface w, the cushion and/or pad 160 reduces vibrations and noise that are generated by the washing machine.

When the body frame 120 is fixed to the wall surface w, the first frame edge 121 is spaced apart or away from the wall surface w. The mounting parts 122 contact the wall surface w through the cushions and/or pads 160, and thereby, a spacing and/or predetermined distance is maintained between the first frame edge 121 and the wall surface w.

The curtain 200 is at and/or along the first frame edge 121. The curtain 200 may comprise or consist of a material that may be deformable. In more detail, the curtain 200 may comprise a rubber material (e.g., a natural or synthetic rubber). Therefore, even though a gap arises between the body frame 120 and the wall surface w when the body frame 120 is fixed to the wall surface w, the gap between the body frame 120 and the wall surface w includes and/or is filled by the curtain 200.

A pocket and/or groove 124 may be at and/or along the first frame edge 121. The curtain 200 may be in (e.g., inserted into) the pocket and/or groove 124. Therefore, the curtain 200 may be easily installed on the body frame 120. That is, the curtain 200 may be easily assembled to the body frame 120 by pushing or inserting a part of the curtain 200 into the pocket and/or groove 124.

A second frame edge 123 may be outside the first frame edge 121 and may define at least part of the pocket and/or groove 124. The second frame edge 123 may be lower than the first frame edge 121 (e.g., farther away from the wall surface). Therefore, the curtain 200 may freely deform by an external force (such as pressure from the wall), especially when the curtain 200 extends beyond the first frame edge 121 and the cushion and/or pad 160. The second frame edge 123 is below the first frame edge 121, such that when the curtain 200 is deformed, the curtain 200 deformed in a direction towards the second frame edge 123. That is, consistency may be maintained in that the curtain 200 deforms outward along substantially the entire length of the frame edges 121 and 123.

The curtain 200 comprises or consists of a rubber material (e.g., a natural or synthetic rubber) so that the curtain 200 may return or be restored to its original shape when no external force is applied to it.

When viewed directly towards the back surface of the body frame 120, the pocket and/or groove 124 may have a shape similar to the shape of the first frame edge 121. That is, the first frame edge 121 forms an border of the body frame 120, and the pocket and/or groove 124 may also form or extend along the border of the body frame 120. In one embodiment, the pocket and/or groove 124 forms and/or extends along substantially the entire border of the body frame 120.

The pocket and/or groove 124 may have a depth d and a width e, and the depth d is greater than the width e. Therefore, when the curtain 200 is inserted into the pocket and/or groove 124, the shape and/or security of the curtain 200 in the pocket and/or groove 124 may be more effectively maintained, as long as no inappropriate, unusual, and/or unexpected external force is applied.

On the other hand, the curtain 200 may be inserted into the pocket and/or groove 124 using an adhesive applied onto a part of the curtain 200 (e.g., the part of the curtain 200 inserted into the pocket and/or groove 124). Therefore, the curtain 200 may be physically and/or chemically fixed to the pocket and/or groove 124.

On the other hand, when no external force is applied to the curtain 200, a width f of the curtain 200 may be 105% to 140% of (e.g., 5-40% greater than) the width e of the pocket and/or groove 124. When a curtain 200 having such a width is inserted into the pocket and/or groove 124, the curtain 200 may fit into the pocket and/or groove 124 in a compressed state. Therefore, the curtain 200 may not arbitrarily move away from the pocket and/or groove 124, but is compression-fitted or otherwise securely maintained in the pocket and/or groove 124.

When the width f of the curtain 200 is at least 5% greater than the width e of the pocket and/or groove 124, a coupling force between the curtain 200 and the pocket and/or groove 124 may be maintained. However, when the width f of the curtain 200 is less than 105% of the width e of the pocket and/or groove 124, the curtain 200 may be loose, and when the curtain 200 is loose, the curtain 200 may arbitrarily come out of or move away from the pocket and/or groove 124 during the process of manufacturing the washing machine 100, or during handling, installing or moving the washing machine 100. Therefore, the width f of the curtain 200 may be at least 5% greater than the width e of the pocket and/or groove 124.

The width f of the curtain 200 may be 140% or less of the width e of the pocket and/or groove 124. When the width f of the curtain 200 is excessively large, it may be difficult to insert the curtain 200 into the pocket and/or groove 124 during assembly and/or manufacturing, and thus the width f of the curtain 200 may be 140% or less of the width e of the pocket and/or groove 124.

The curtain 200 may include a flap 220 and an insert part 210. The insert part 210 is generally inserted into the pocket and/or groove 124, and the flap 220 may be inclined outward (see angle c in FIG. 6). Therefore, when the washing machine 100 is installed on the wall surface w, the flap 220 of the curtain 200 may be deformed due to pressure (e.g., from the wall and/or as a result of tightening a nut to one or more of the anchor bolts 190), and in this case, the direction in which the curtain 200 is deformed may always be an outward direction (e.g., away from the first frame edge 121). That is, the curtain 200 may be deformed in a predetermined direction, and as a result, the external appearance of the curtain 200 may appear to have a consistent shape, even though a section (e.g., the flap 220) of the curtain 200 is deformed, thereby providing an aesthetically attractive external appearance. That is, if the curtain 200 is deformed both inwardly and outwardly in a zigzag shape, without having a predetermined direction of deformation, the deformed shape may be easily conspicuous, and in this case, a location of the deformation will be easily seen or discovered. However, the curtain 200 according to one or more exemplary embodiments of the present disclosure is consistently deformed in one direction, and thereby, the washing machine 100 is aesthetically attractive after being installed on the wall surface w.

Figure 8:
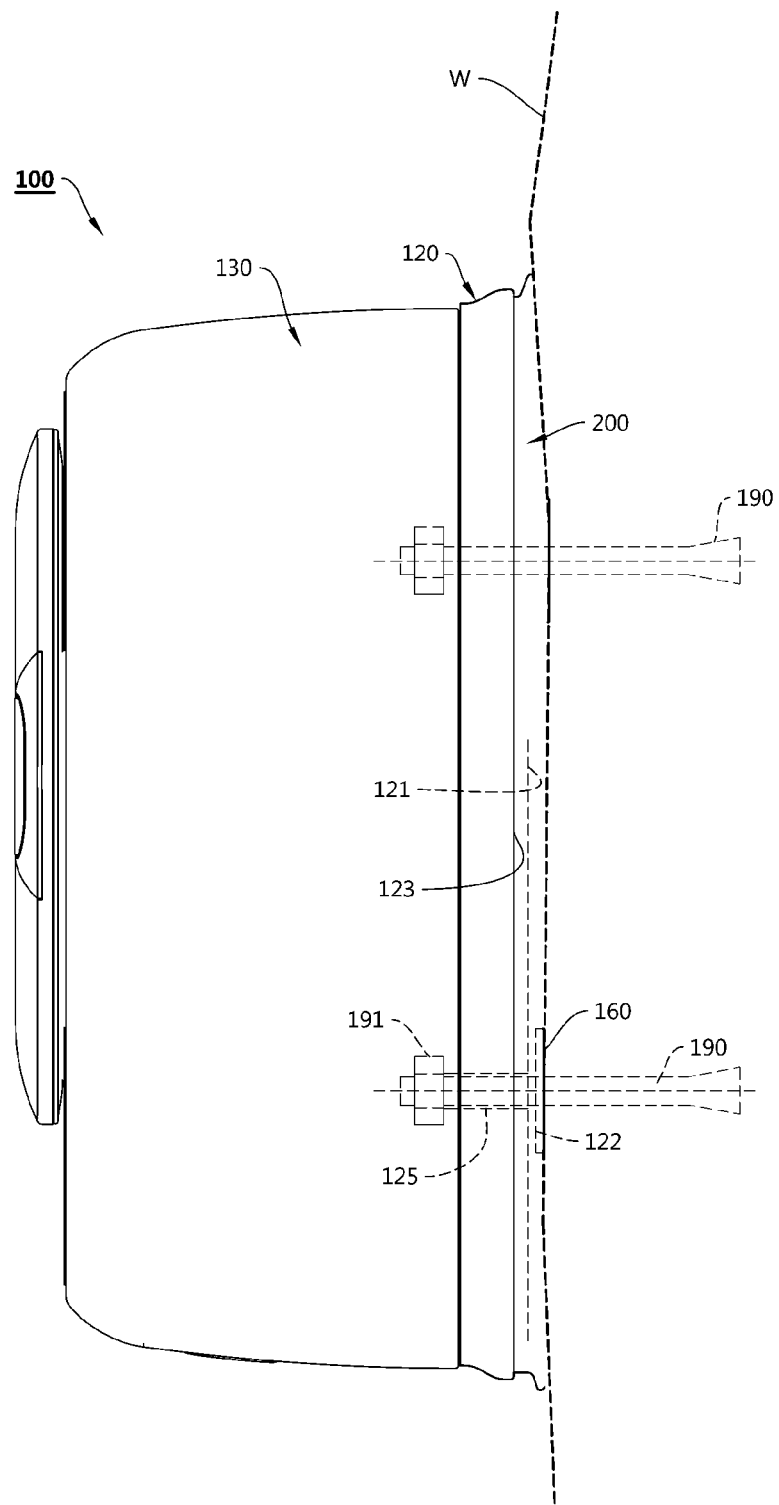
FIG. 8 is a view for explaining an example in which the wall-mounted washing machine according to exemplary embodiments of the present disclosure is installed on a wall surface.

Hereinafter, an example in which the washing machine is installed on the wall surface will be described with reference to FIG. 8. The accompanying FIG. 8 is a view for explaining an example in which the wall-mounted washing machine according to one or more exemplary embodiments of the present disclosure is installed on a wall surface.

One or more (e.g., four) anchor bolts 190 are installed in the wall and/or on the wall surface w. The anchor bolt 190 is inserted through the hole 161 of the cushion and/or pad 160 and through the mounting hole 125 of the body frame 120. A nut 191 is fastened to a threaded portion of each anchor bolt 190 (i.e., a portion that extends from the mounting hole 125, into an interior of the body frame 120). That is, the washing machine 100 is fixed to and installed on the wall surface w by tightening the nuts 191.

The cushion 160 is between the mounting part 122 and the wall surface w in a compressed state, and thereby, the cushion 160 absorbs vibrations and noise generated by the washing machine 100. The first frame edge 121 of the washing machine 100 does not directly contact the wall surface w, thereby preventing the vibrations and noise from being transmitted directly to the wall surface w.

Meanwhile, when the washing machine 100 is installed on the wall surface w, the curtain 200 contacts the wall surface w, and is naturally deformed along and/or by the wall surface w. That is, a space between the washing machine 100 and the wall surface w is covered and/or blocked by the curtain 200. Therefore, foreign substances, moisture, or the like may be prevented from entering or flowing into a rear side of the washing machine 100. The curtain 200 may also have a soundproofing and/or sound-blocking effect. That is, vibrations and noise from the washing machine 100 are transmitted to the outside in the form of sound, but the transmission of at least some sound is blocked by the curtain 200, thereby providing a more comfortable environment without noise (or with reduced noise levels) while washing laundry.

Therefore, the mounting unit for a wall-mounted washing machine according to exemplary embodiments of the present disclosure provides mounting parts that extend beyond the frame edge of the body frame, thereby allowing vibrations and noise to be absorbed by the cushions and/or pads at the end of the mounting parts, the curtain, and/or the space between the body frame and the wall. That is, when the washing machine is installed on the wall, vibrations and noise from the washing machine may not be transmitted directly to the wall surface.

The mounting unit for a wall-mounted washing machine according to exemplary embodiments of the present disclosure may have a curtain on the back surface of the body frame, thereby covering a gap between the wall surface and the washing machine. Therefore, foreign substances or moisture may be prevented from entering or flowing into the back surface and/or side of the washing machine.

The mounting unit for a wall-mounted washing machine according to the present disclosure may be used to install the wall-mounted washing machine on the wall surface securely and/or conveniently, even though the wall surface is not completely flat.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A mounting unit for a wall-mounted washing machine, comprising:
   a body frame having a mounting part and a first frame edge, an end of the mounting part extending beyond the first frame edge;
   a cushion and/or pad at, in or on the mounting part and configured to reduce vibrations and noise,
   wherein when the body frame is fixed to a wall surface, the first frame edge is away from the wall surface; and
   a curtain at the first frame edge such that when the body frame is fixed to the wall surface, a gap between the body frame and the wall surface includes the curtain.

2. The mounting unit of claim 1, further comprising a pocket and/or groove at the first frame edge, wherein the curtain is in the pocket and/or groove.

3. The mounting unit of claim 2, further comprising a second frame edge outside the first frame edge and at least partially defining the pocket and/or groove.

4. The mounting unit of claim 3, wherein the first frame edge extends beyond the second frame edge.

5. The mounting unit of claim 2, wherein the pocket and/or groove has a shape similar to that of the first frame edge from a direct back view of the body frame.

6. The mounting unit of claim 5, wherein the pocket and/or groove has a width and a depth greater than the width.

7. The mounting unit of claim 6, wherein when no external force is applied to the curtain, a width of the curtain is 105% to 140% greater than the width of the pocket and/or groove.

8. The mounting unit of claim 3, wherein the pocket and/or groove has a shape similar to that of the first frame edge from a direct back view of the body frame.

9. The mounting unit of claim 8, wherein the pocket and/or groove has a width and a depth greater than the width.

10. The mounting unit of claim 9, wherein when no external force is applied to the curtain, a width of the curtain is 105% to 140% greater than the width of the pocket and/or groove.

11. The mounting unit of claim 1, wherein the curtain unit comprises an insert, the mounting unit further comprises a flap at the insert, and the flap extends outward.

12. A mounting unit for a wall-mounted washing machine, comprising:
   a body frame having a first frame edge and a pocket and/or groove at the first frame edge; and
   a curtain in the first frame edge,
   wherein when the body frame is fixed to a wall surface, a gap between the body frame and the wall surface includes the curtain.

13. The mounting unit of claim 12, wherein the body frame further includes a mounting part that extends beyond the first frame edge.

14. The mounting unit of claim 13, wherein the body frame further includes a cushion and/or pad at the mounting part and configured to reduce vibrations and noise of the wall-mounted washing machine.

15. The mounting unit of claim 14, wherein when the body frame is fixed to a wall surface, the first frame edge is away from the wall surface.

16. The mounting unit of claim 12, wherein the body frame further includes a cushion and/or pad at the mounting part and configured to reduce vibrations and noise of the wall-mounted washing machine.

17. The mounting unit of claim 12, wherein when the body frame is fixed to a wall surface, the first frame edge is away from the wall surface.

* * * * *